United States Patent [19]
Miller

[11] Patent Number: 6,120,086
[45] Date of Patent: Sep. 19, 2000

[54] VEHICLE VISOR HAVING SNAP-IN SUPPORT PIN

[75] Inventor: Douglas C. Miller, Hersey, Mich.

[73] Assignee: Lear Donnelly Overhead Systems, LLC, Southfield, Mich.

[21] Appl. No.: 09/300,192

[22] Filed: Apr. 27, 1999

Related U.S. Application Data

[60] Provisional application No. 60/085,603, May 15, 1998.

[51] Int. Cl.[7] .................................................... B60J 3/00
[52] U.S. Cl. ........................................ 296/97.9; 296/97.1
[58] Field of Search .................................. 296/97.1, 97.6, 296/97.8, 97.9, 97.11, 97.12, 97.13

[56] References Cited

U.S. PATENT DOCUMENTS

| | | |
|---|---|---|
| 2,048,105 | 7/1936 | Cobbs . |
| 2,524,617 | 10/1950 | Wyse . |
| 2,598,029 | 5/1952 | Baldwin . |
| 2,637,128 | 5/1953 | Weeks . |
| 3,193,323 | 7/1965 | Herr et al. . |
| 3,430,299 | 3/1969 | Copen . |
| 3,827,748 | 8/1974 | Herr et al. . |
| 4,664,435 | 5/1987 | Dietz et al. . |
| 4,679,843 | 7/1987 | Spykerman . |
| 4,707,019 | 11/1987 | Ebert et al. . |
| 4,711,483 | 12/1987 | Gulette et al. . |
| 4,720,132 | 1/1988 | Ebert et al. . |
| 4,763,946 | 8/1988 | Robbins et al. . |
| 4,765,674 | 8/1988 | Svensson .............................. 296/97.13 |
| 4,773,698 | 9/1988 | Svensson ................................ 296/97.9 |
| 4,867,500 | 9/1989 | Oosterbaan et al. . |
| 5,054,734 | 10/1991 | Gabas ................................. 296/97.9 X |
| 5,056,852 | 10/1991 | Miller . |
| 5,066,061 | 11/1991 | Miller . |
| 5,308,137 | 5/1994 | Viertel et al. . |
| 5,538,311 | 7/1996 | Fusco et al. . |
| 5,577,791 | 11/1996 | Viertel et al. . |
| 5,816,642 | 8/1998 | Wilson .................................. 296/97.9 |
| 5,823,603 | 8/1998 | Crotty, III ........................... 296/97.12 |

*Primary Examiner*—D. Glenn Dayoan
*Assistant Examiner*—Jason Morrow
*Attorney, Agent, or Firm*—Brooks & Kushman P.C.

[57] ABSTRACT

A sun visor assembly includes first and second core halves foldable along a common edge to form an outboard cavity. One of the first and second core halves includes a retaining assembly. A cover material is configured for covering the first and second core halves, and includes at least one slit formed therethrough. A support pin assembly includes at least one snap foot insertable through the slit for engagement with the retaining assembly to secure the support pin assembly within the outboard cavity and to secure the cover material to the first and second core halves. A method for forming a sun visor assembly is also provided.

8 Claims, 2 Drawing Sheets

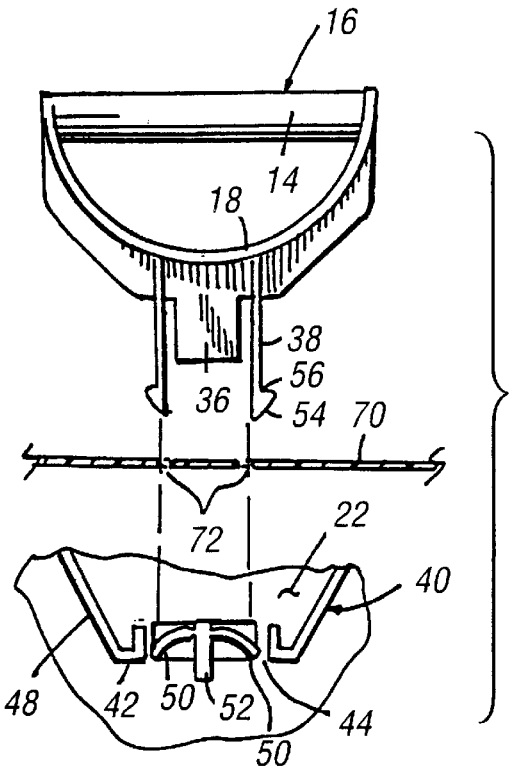
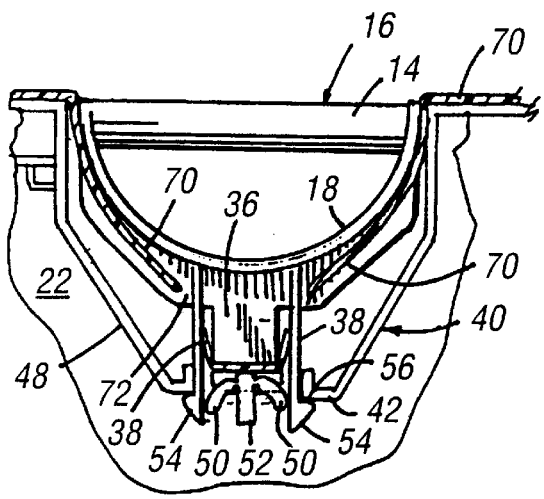
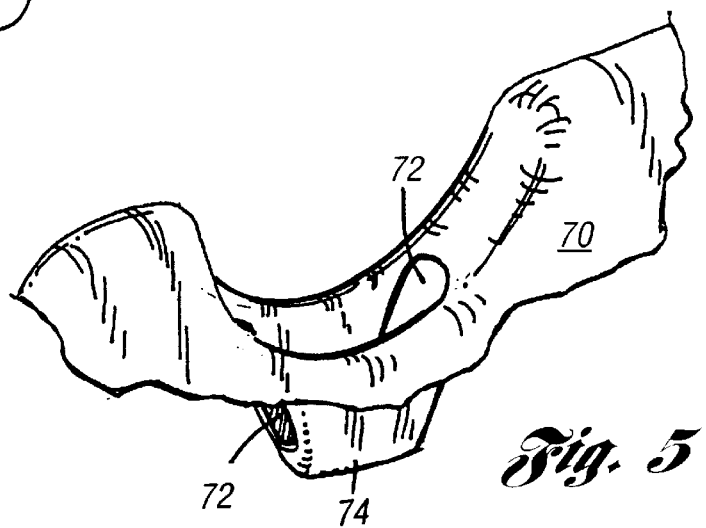

VEHICLE VISOR HAVING SNAP-IN SUPPORT PIN

CROSS-REFERENCE TO RELATED APPLICATION

This application claims the benefit of U.S. provisional patent application Ser. No. 60/085,603, filed May 15, 1998, which is hereby incorporated by reference.

TECHNICAL FIELD

This invention relates to a visor with a snap-in outboard support pin for finishing a cover in a notch formed in the visor for the pin. In another of its aspects, the invention relates to a method for making a visor with an outboard support pin which finishes the fabric at a notch for the pin.

BACKGROUND ART

Visors for blocking the sun and other sources of glare have been standard equipment on motor vehicles for many years. Generally, a visor is mounted to the headliner above the windshield in front of both the driver and the front seat passenger. Traditionally, the visor has included a support pin to latch the visor to a retaining clip of the headliner. When the support pin is unlatched from the retaining clip, the occupant may pivot the visor to a position away from the front windshield.

Sun visors for vehicles have been manufactured of a plastic, shell-type core or frame covered with material that is colored to match the interior upholstery of the vehicle. Some early visor designs included an assembly process wherein the edge of the material covering the visor was trimmed using a trim bead. Particular designs stitched the trim bead directly into the plastic material cover of the frame. However, this stitching is both expensive and difficult. Furthermore, these trim bead or stitch designs are unattractive to some users. Thus, some newer designs have eliminated the trim bead and have provided a new and clean appearance on the visor edges while still effectively retaining the material covering on the visor shell.

Newer visor designs require that the material utilized as a covering for the visor be pre-tucked or adhered inside the body of the visor before the two visor halves are attached or bonded together because the material covering tends to pull out or loosen during or after shell closure. The material covering adhesion process requires that a bonding cement or glue be used to attach the material covering to the inside of a shell half prior to construction of the visor as a separate operation.

U.S. Pat. No. 5,056,852 discloses a visor with a mounting post or support pin having a tucking flange operatively connected to a visor frame. For this particular assembly, the visor halves are provided with edges that are adapted to form clamping flanges to secure the material covering in an aesthetically pleasing fashion about the support pin. As is conventional, distal ends of the visor mate to pinch edges of the cover between the visor halves. For this design, the support pin includes a tucking flange used to push the material covering into a juxtaposed set of notches contained along a common edge or fold of the visor halves before the visor halves are brought together to form the shell-type visor body. Thus, the pin is present in the notches at the time the visor halves are initially closed and remains in the aperture formed by the juxtaposed notches until the visor body is fully formed. After closing of the visor halves, the support pin is trapped by the edges defining clamping flanges, which thereby retain the material fabric within the visor body. Thus, this relatively complicated process requires that the material covering be held in place at the distal ends of the visor halves, while at the same time the support pin, with its tucking flange, is held within the juxtaposed notches along the fold axes of the visor halves so that the cover is in position for retainment by the clamping flanges.

DISCLOSURE OF INVENTION

A visor comprises a visor core and an outboard support pin assembly including downwardly depending snap feet flanking an arm, both of which are received within a cavity defined by visor halves foldable along a common edge, the snap feet being securable within a retaining assembly formed integral with one of the visor halves and the arm forcing a material cover for the visor halves downwardly during insertion of the support pin assembly within the folded visor halves, whereby the snap feet are secured within the retaining assembly and the arm stretches the cover about the edges defining the opening between the visor halves to give the finished visor a neat appearance.

Other objects, features, and advantages of the present invention will be apparent from the ensuing description in conjunction with the accompanying drawings.

BRIEF DESCRIPTION OF DRAWINGS

FIG. 3 is a fragmentary exploded side view of the snap-in support pin, material covering, and a retaining assembly prior to insertion of the snap-in support pin into the visor of FIGS. 1 and 2;

FIG. 4 is a fragmentary view of the snap-in support pin securing the material covering within the retaining assembly of FIG. 3; and FIG. 5 is a fragmentary perspective view of the conformed shape of the material covering of FIGS. 1–4 after it is secured to the retaining assembly of FIGS. 3 and 4, with the snap-in support pin assembly 16 removed to illustrate the conformity of the material covering upon full insertion of the snap-in support pin.

BEST MODE FOR CARRYING OUT THE INVENTION

Figure 1:
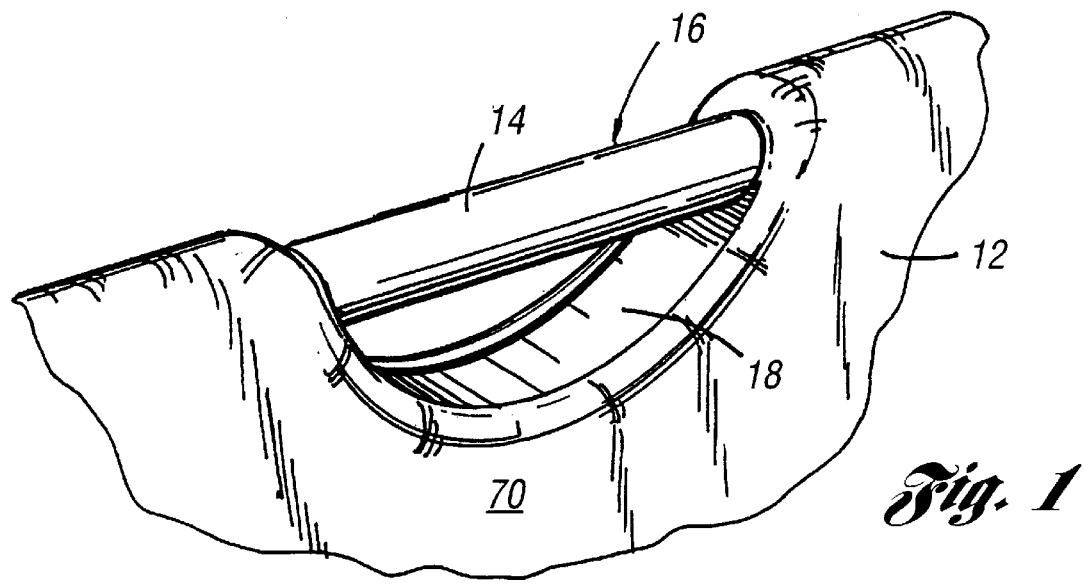
FIG. 1 is a fragmentary perspective view of an assembled visor having a snap-in support pin for retaining a material covering about the exterior of a sun visor according to the invention.

Referring now to the drawings and to FIG. 1 in particular, a visor 12 (only partially shown) has a support pin assembly 16. The sun visor 12 includes a pivot support arm (not shown) that mounts the visor for pivotal movement about an axis coaxial with a pin portion 14 of the support pin assembly 16, as well as rotationally about a fixed mounting bracket (not shown), which is typically mounted to a vehicle frame (not shown). Thus, the visor 12 can be rotated about the pivot support arm and support pin assembly 16 to shield a vehicle operator's or passenger's eyes from sun or other incident rays through the vehicle windshield. Further, the visor 12 can be rotated relative to the mounting bracket to block the operator's or passenger's eyes from sun or other incident rays through a vehicle's side windows. As is conventional, the support pin assembly 16 is received in a retaining clip (not shown) secured to the vehicle body through the headliner and above the windshield of the vehicle.

Figure 2:
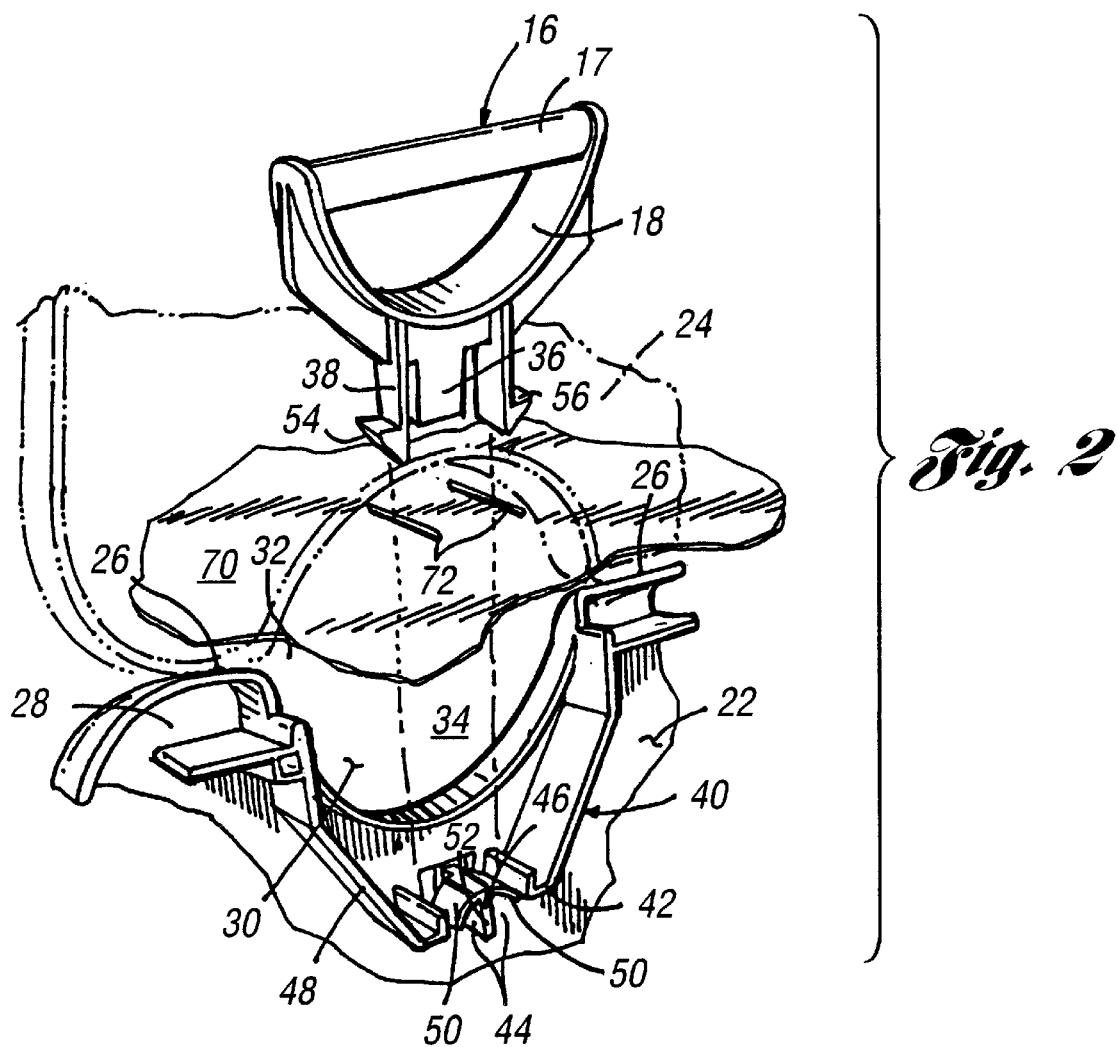
FIG. 2 is a fragmentary exploded perspective view of visor halves, the material covering, and the snap-in support pin for the visor assembly of FIG. 1.

Referring now to FIG. 2, the visor 12 comprises visor halves 22,24 foldable along a common axis 26. Further, the visor 12 includes juxtaposed notches 30,32 formed in each visor half 22,24 along the common axis 26. Opposite the common axis 26, each visor half 22,24 has a distal end (not shown) mated to the distal end of the other for forming the visor 12. A cavity 28 is formed between the visor halves 22,24 when they are joined at their distal ends by folding along the common axis 26. Further, the notches 30,32, when the visor halves 22,24 are brought together, form an opening 34 adapted to receive the support pin assembly 16, which includes a pair of snap feet 38 and an arm 36, all of which depend downwardly and coplanarly from an arcuate base 18 of the support pin assembly 16. Each of the snap feet 38 includes a ramped end 54 having a locking notch 56 adjacent its widest point.

A retaining assembly 40, disposed subadjacent the opening 34, is formed by bringing the visor halves 22,24 together. As seen best in FIG. 2, the retaining assembly 40 is generally U-shaped and includes a base rib 42 including a pair of apertures 44 flanking an intermediately disposed generally T-shaped strengthening member 46. The base rib 42 is supported by a pair of L-shaped ribs 48 extending upwardly from the ends of the base rib 42. The retaining assembly 40 is preferably formed integral with the visor half 22, as shown. Further, the visor half 24, when folded against the visor half 22 during assembly, includes an inner surface (not shown) that abuts the retaining assembly 40 to endorse the apertures 44. The T-shaped strengthening member 46 includes a pair of flexible ribs 50 extending generally transversely from a vertically oriented central support 52.

As best shown in FIG. 4, upon installation of the support pin assembly 16, the snap feet 38 including their ramped ends 54 and locking notches 56, are received in the apertures 44 with the locking notches 56 secured below the base rib 42 and the flexible ribs 50 biasing the snap feet 38 outwardly to prevent the locking notches 56 from disengagement below the base rib 42.

A cover 70, comprising a material which may be colored and textured to match the interior upholstery of the vehicle, is placed over the visor halves 22,24 prior to folding the halves 22,24 along their common axis 26. Preferably, the cover 70 extends over the halves 22,24 so that it covers their entire surface, as well as the notches 30,32 and opening 34 formed thereby. Then, the visor halves 22,24 are preferably folded along their common axis 26 and clamped along their mated distal ends to trap the cover 70 therebetween. Next, a pair of slits 72 coaxial with the apertures 44 are made in the cover 70 in the area placed over the notches 30,32. Of course, the slits 72 could be formed prior to placement of the cover 70 over the visor halves 22,24.

Then, the support pin assembly 16, with its downwardly depending snap feet 38 and arm 36, is positioned so that the feet 38 are inserted through the slits 72 and the arm 36 abuts a portion 74 of the cover 70 between the slits 72. Next, the support pin assembly 16 is forced downwardly so that the ramped ends 54 of the snap feet 38 engage the edges defining the apertures 44, whereupon the snap feet 38 cam along the ramped ends 54 until the ramped ends 54 extend below the apertures 44, at which point the locking notches 56 engage the lower surface of the base rib 42. This position of the locking notches 56 below the base rib 42 is a result of the normal bias of the snap feet 38 as well as the outward bias exerted thereon by the flexible ribs 50.

At the same time, the snap feet 38 are extended through the base rib 42 and the ramped ends 54 thereof are lockingly retained thereunder. The arm 36 pushes the portion 74 of the cover 70 downwardly until it is disposed between a top edge of the central support 52 and a bottom edge of the arm 36. This movement of the support pin assembly 16 downwardly stretches the cover 70 around the edges of the visor halves 22,24 defining the aperture, whereupon a neat finished appearance is achieved by full insertion, as best shown in FIG. 1. The relative positions of the slit 72 and the portion 74 of the cover 70 is best shown in FIG. 5, which depicts the cover 70 in place in the juxtaposed notches 30,32 and cavity 28 with the support pin assembly 16 removed for illustration purposes.

Because the cover 70 is stretched and secured at the clamping ends of the visor halves 22,24 prior to insertion of the support pin assembly 16 within the apertures 44 formed by the juxtaposed notches 30,32, the appearance of the fabric 70 surrounding the support pin assembly 16 is stretched after the cover 70 has been pulled taut by the folding and clamping of the halves 22,24 at their mated distal ends. Further, the positive locking of the snap feet 38 within the apertures 44 in the base rib 42 is superior to the prior art designs because the flexible ribs 50 bias the snap feet 38 into the locked position wherein the locking notches 56 are trapped below the base rib 42. This prevents pull out of the support pin assembly 16 because of excessive force exerted on the support pin assembly 16 or repeated forces acting on the support pin assembly 16 to weaken the engagement of the support pin assembly 16 with the visor 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sun visor assembly comprising:
   first and second core halves foldable along a common edge to form an outboard cavity, one of said first and second core halves including a retaining assembly;
   a cover material configured for covering the first and second core halves, and having at least one slit formed therethrough; and
   a support pin assembly including at least one snap foot insertable through said at least one slit for engagement with the retaining assembly to secure the support pin assembly within the outboard cavity and to secure the cover material to the first and second core halves;
   wherein said retaining assembly includes a base rib engageable with the snap foot and a flexible rib configured to flex to allow insertion of the snap foot, and to force the inserted snap foot against the base rib to prevent disengagement of the snap foot.

2. The sun visor assembly of claim 1, wherein said support pin assembly includes an arm positioned for stretching the cover material into the cavity so that the cover material is pulled taut over the first and second core halves.

3. The sun visor assembly of claim 1, wherein said support pin assembly comprises an arcuate base which is exposed and hides the snap foot from view when the snap foot is inserted into the retaining assembly to provide a neat, finished appearance.

4. A sun visor assembly comprising:
   first and second core halves foldable along a common edge to form an outboard cavity, one of said first and second core halves including a retaining assembly;

a cover material configured for covering the first and second core halves, and having at least one slit formed therethrough; and a support pin assembly including at least one snap foot insertable through said at least one slit for engagement with the retaining assembly to secure the cover material to the first and second core halves;

wherein said support pin assembly includes an arm positioned for stretching the cover material into the cavity so that the cover material is pulled taut over the first and second core halves.

5. The sun visor assembly of claim 4, wherein said retaining assembly includes a base rib engageable with the snap foot and a flexible rib configured to flex to allow insertion of the snap foot, and to force the inserted snap foot against the base rib to prevent disengagement of the snap foot.

6. The sun visor assembly of claim 4, wherein said support pin assembly comprises an arcuate base which is exposed and hides the snap foot from view when the snap foot is inserted into the retaining assembly to provide a neat, finished appearance.

7. A method of forming a sun visor assembly comprising:

providing first and second visor halves foldable toward each other along a common axis, wherein one of said visor halves includes a retaining assembly;

positioning a cover material over the first and second visor halves;

folding the first and second visor halves together along their common axis to trap the cover material therebetween;

providing at least one slit in the material cover; and inserting a support pin assembly through said at least one slit for engagement with the retaining assembly to stretch the cover material taut over the first and second core halves.

8. The method of claim 7, wherein said support pin assembly includes at least one snap foot and the retaining assembly comprises a base rib, and the method further comprises biasing the snap foot toward the base rib to prevent disengagement of the support pin assembly.

\* \* \* \* \*